Figure 1:
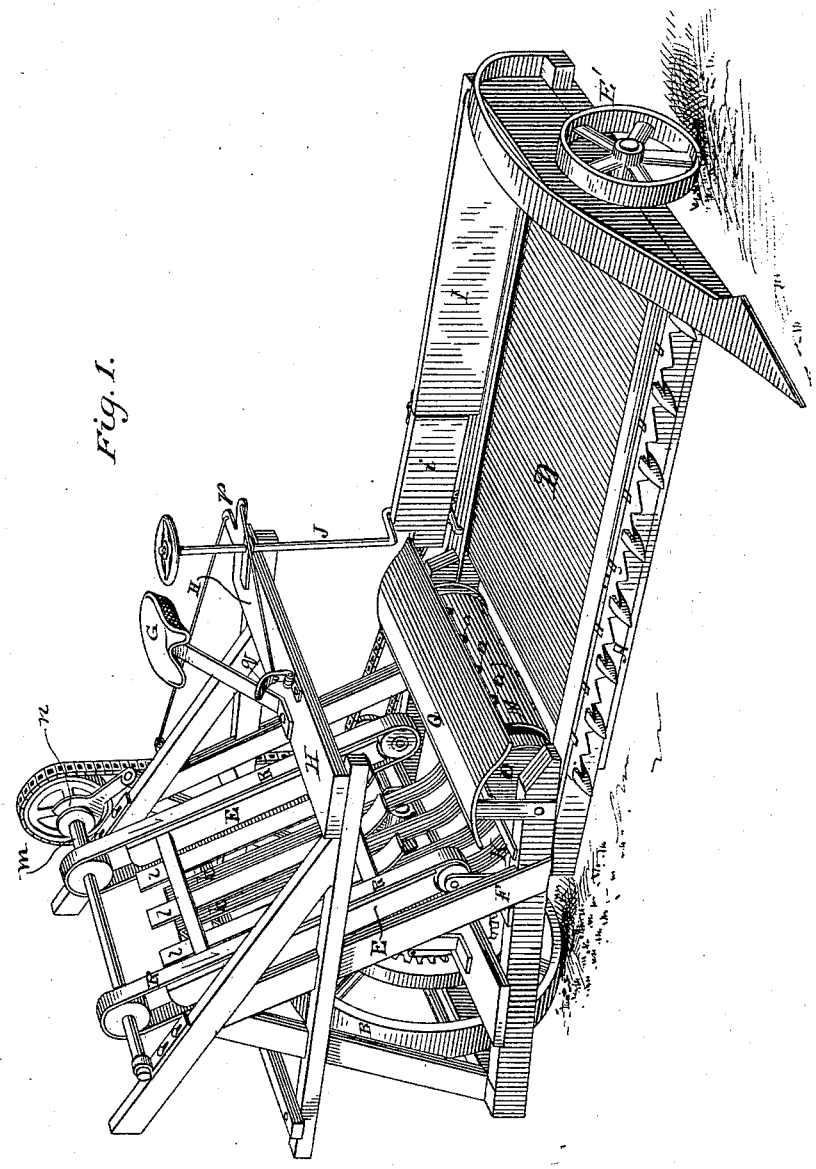

(No Model.)

M. T. RIDOUT.
HARVESTER.

No. 279,106. Patented June 5, 1883.

Attest:
R. F. Barnes.
J. C. Turner.

Inventor:
Moses T. Ridout
By his Atty R. D. O. Smith (No Model.) 5 Sheets—Sheet 2.

M. T. RIDOUT.
HARVESTER.

No. 279,106. Patented June 5, 1883.

Attest:
R. H. Barnes.
J. C. Turner

Inventor:
Moses T. Ridout
By his atty R. D. Smith (No Model.) 5 Sheets—Sheet 3.

M. T. RIDOUT.
HARVESTER.

No. 279,106. Patented June 5, 1883.

(No Model.)  5 Sheets—Sheet 4.

M. T. RIDOUT.
HARVESTER.

No. 279,106. Patented June 5, 1883.

Attest:
R. F. Barnes.
J. C. Turner.

Inventor:
Mose T. Ridout
By his atty
R. D. O. Smith (No Model.)  
5 Sheets—Sheet 5.

M. T. RIDOUT.
HARVESTER.

No. 279,106.                Patented June 5, 1883.

Attest:  
C. Clarence Poole  
Alex. Scott

Inventor:  
Moses T. Ridout  
By his atty  
R. D. Smith

UNITED STATES PATENT OFFICE.

MOSES T. RIDOUT, OF LAKESIDE, MINNESOTA.

HARVESTER.

SPECIFICATION forming part of Letters Patent No. 279,106, dated June 5, 1883.

Application filed April 13, 1881. (No model.)

*To all whom it may concern:*

Be it known that I, MOSES T. RIDOUT, of Lakeside, Renville county, Minnesota, have invented new and useful Improvements in Harvesters; and I do hereby declare that the following is a full and correct description of the same.

My invention relates to that class of reaping-machines known as "harvesters"—viz., machines wherein the cut grain is received upon endless belts or aprons, and thereby carried across the machine and delivered to an elevator, which carries it over the main wheel and deposits it in the binder-receptacle.

The features of my machine which I believe to be new and useful are—

First. A device at the back of the apron-frame and near to the foot of the elevator, whereby the heads of the grain are engaged and retarded as the grain is moved toward the elevator. The grain is thereby straightened upon the apron. It is well known that the butts of the grain usually move across the machine more slowly than the heads, because the butts are being constantly retarded by contact with the falling grain, &c. Various devices have been placed upon these machines designed to accelerate the movement of the butts, so that they should be caused to overtake the heads and be delivered straight to the elevator. I propose to accomplish the same end by what appears to be a more natural method—viz., by retarding the heads also, and thus cause the grain-stalks to move with similar speeds at both ends. Various devices may be adapted for this purpose. The most simple and efficient is a hinged board provided with a crank-rod or other efficient and proper controlling device which extends to a point convenient to the hand of the driver, so that he can control the position of it at will, and thus cause the heads of the grain to be more or less retarded, as may be desired or proper. This hinged board has also another important function. It carries all the scattering grain into the receptacle before being bound.

Second. Ordinarily, and, so far as I know, universally, the grain is seized by the elevator directly it reaches the end of the apron-carrier, and is thereby discharged into a receptacle at the top of the machine, where it is allowed to remain until a quantity sufficient for a bundle has accumulated. It is there exposed to disturbance by the wind, &c. I think it preferable to locate the receptacle between the apron-carrier and the elevator, so that whatever quantity of grain may be permitted to accumulate it will be in a place which is protected from all disturbing causes. I therefore place a receptacle at the inner end of the apron-carrier between the platform and master-wheel, and arrange the elevator to be intermittent in its operation, so as to take from said receptacle and carry to the binder only so often as may be required. The stopping and starting of the elevator may be automatic or at will of the attendant, as may be desired.

Third. With a receptacle located between the apron-conveyer and the elevator, it is necessary to control positively the entrance of the grain to the receptacle and its forcible retention there. I therefore place a grain conveyer or packer at the entrance of the receptacle at the inner end of the apron-conveyer.

Fourth. With a receptacle at the inner end of the apron-conveyer and an intermittently-moving elevator, it is desirable that the elevator should be furnished with a sufficient number of teeth, so that the entire quantity for a gavel shall be moved from the receptacle at once, and I therefore place upon the elevator-chains one or more bars armed with teeth to constitute elevator rake or rakes.

There are other minor matters of structure which will be particularly described hereinafter.

Having now indicated the novel parts of my invention, I will more particularly describe them, having reference to the accompanying drawings, wherein—

Figure 2:
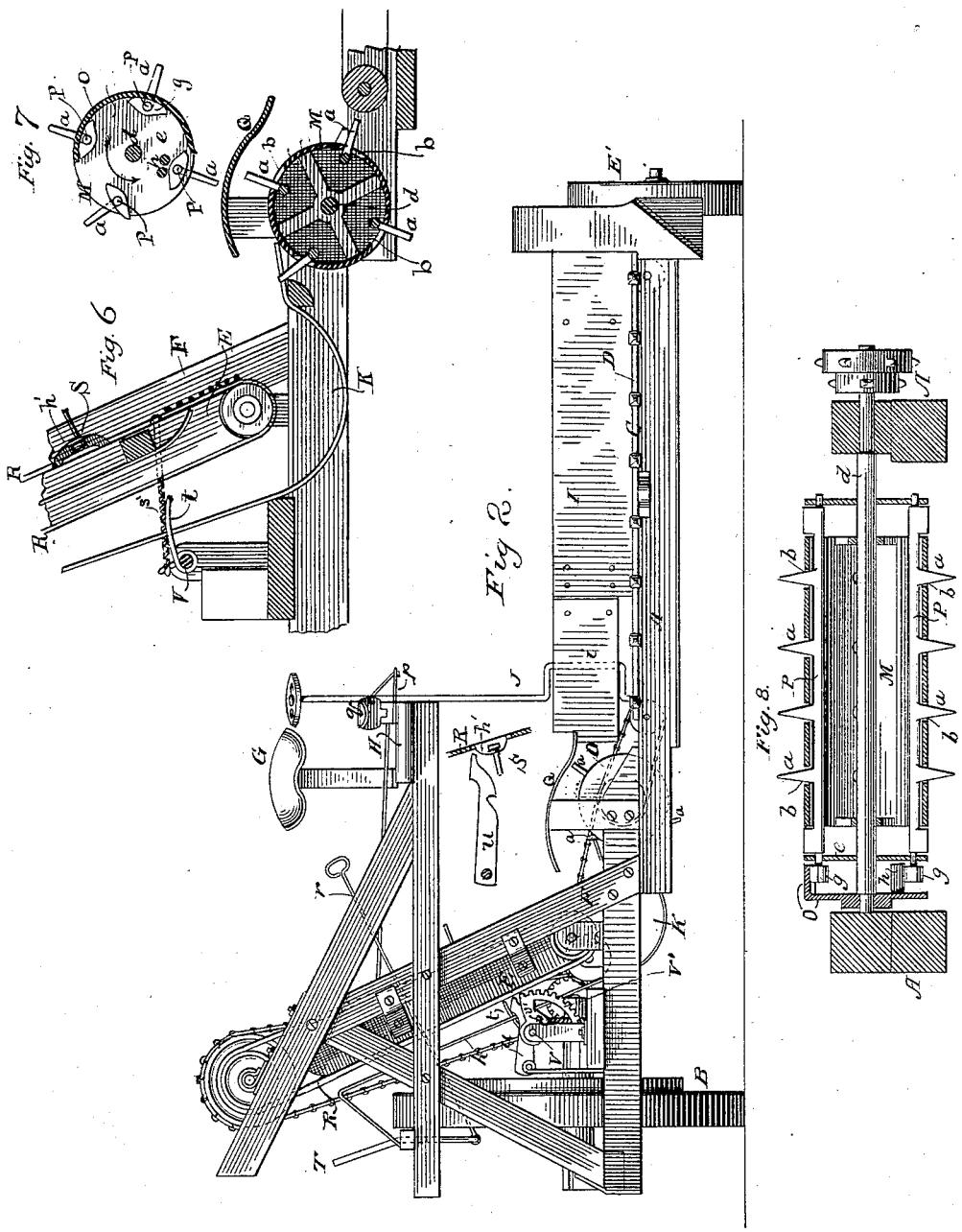
Figure 3:
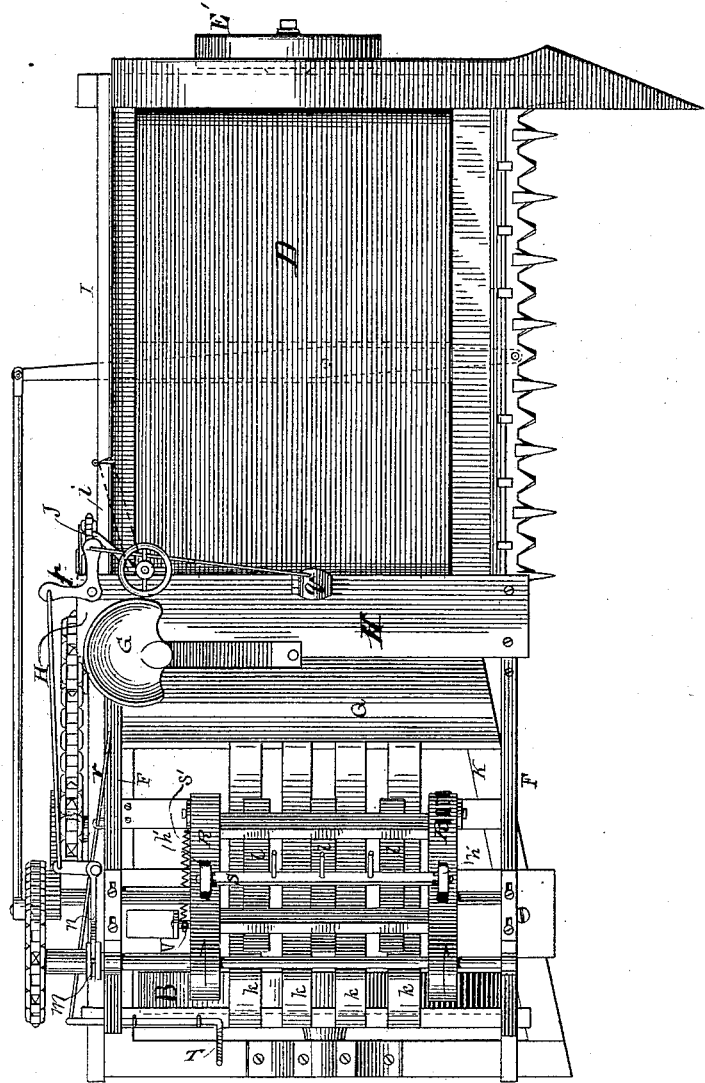
Figure 4:
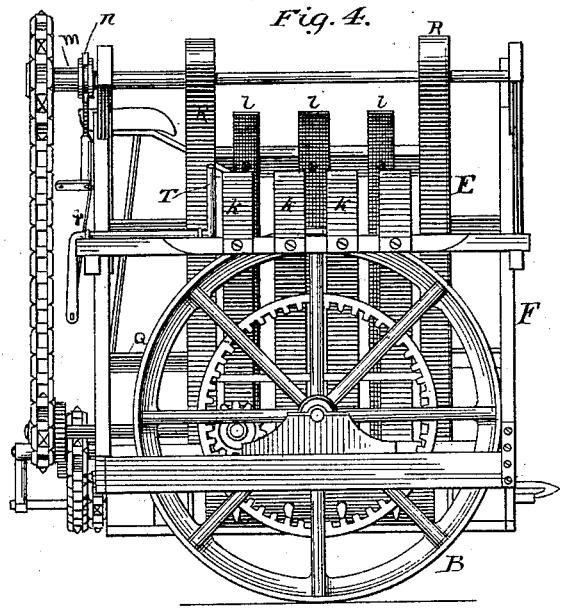
Figure 5:
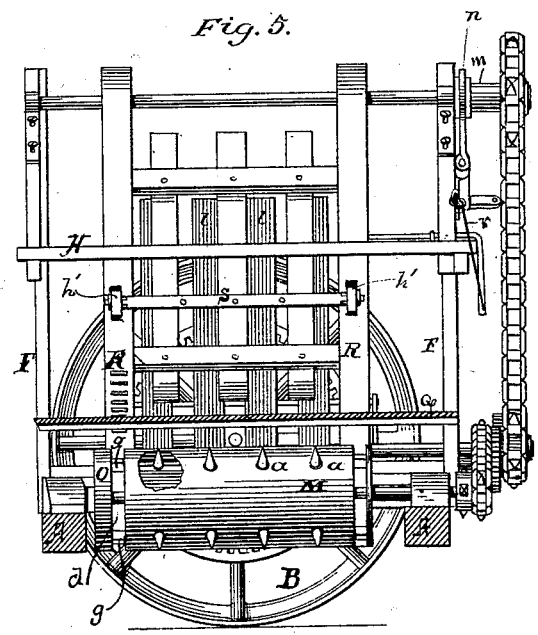
Figure 9:
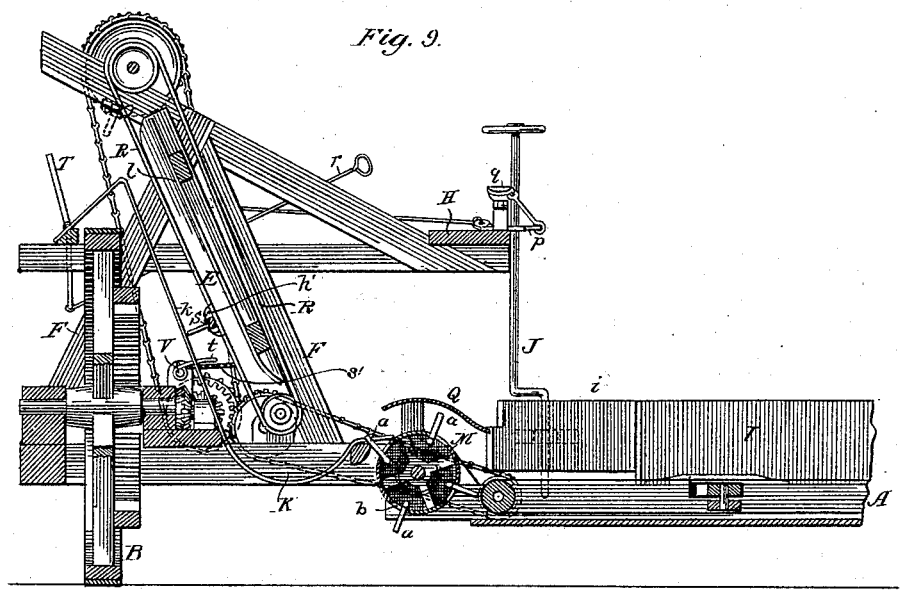
Figure 10:
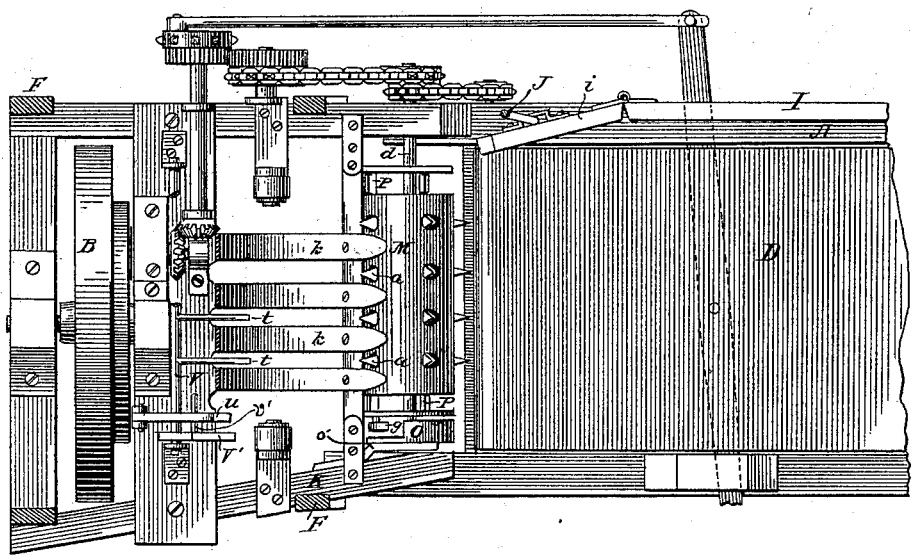

Figure 1 is a perspective view of my machine. Fig. 2 is a front elevation of the same. Fig. 3 is a plan. Fig. 4 is an outer end elevation. Fig. 5 is a sectional elevation of the inner side of the elevator. Fig. 6 is a vertical longitudinal section through the receptacle and packer. Fig. 7 is another longitudinal section through the packer, showing the cam-movement. Fig. 8 is a longitudinal section of the packer. Fig. 9 is a vertical central transverse section through the elevator. Fig. 10 is a plan of the packer and receptacle with the elevator removed.

A is the main frame of the machine, constructed in the usual manner. The cutting apparatus C is placed along the front edge of said frame, and the cut grain is received upon the endless apron D, and conveyed thereby toward one end of the machine and delivered. B is the main supporting and driving wheel, and E' is the grain-wheel. E is the elevator-frame, mounted upon the inner end of the main frame over the main wheel B. The driver's seat G is mounted upon a foot-board, H, supported upon the elevator-frame. All of these parts are substantially like other machines of this class.

Along the rear edge of the main frame there is a back board, I, to prevent the cut grain from being pushed over the rear edge of the apron. Usually, however, the heads of the grain do not reach the back board. When the grain has been cut and has fallen upon the apron, and has commenced to move toward one end of the machine with said apron, the butts of the grain not only drag somewhat upon the front girt of the main frame, but they are continually in contact with the falling grain; and from all these causes the movement of the butts is less free and unobstructed than the movement of the heads, and before reaching the inner end of the machine the grain has become more or less oblique in its position upon the apron. Various devices have been made to hasten the movement of the butts and prevent this lagging; but such devices are objectionable so far as they add to the mechanism of the machine. I accomplish the desired result by placing at the back of the machine an obstruction to retard the heads of the grain to a degree equal to the retardation of the butts, and in that way I prevent the heads from moving faster than the butts, and cause the grain to remain straight upon the platform.

A variety of devices may be employed to effect the desired retardation of the heads, and I do not propose to attempt a description of all of such devices, but will show what I consider the most simple and inexpensive device—viz., a hinged section, $i$, of the back board, I. The free end of this section may be moved inward to a greater or less distance, according to the length of the grain-stalks or to the amount of resistance desired. Its position will be a matter of constant observation and readjustment. When caused to swing inward its inner surface will present an inclined surface, against which the heads of the grain will strike as they advance, and the tendency will be, as above set forth, to obstruct and retard the movement of the heads of the grain and shift their position upon the apron-carrier to a degree equal to the corresponding shifting of the butts, and thereby keep the grain always straight upon said apron. Another effect in a lesser degree is to shift the grain endwise and cause it to move toward the front of the machine as it enters the receptacle. The section $i$ is controlled by a crank-rod, J, or other proper mechanical means under constant control of the driver. The crank-rod passes upward through the foot-board H to a point convenient to the hand of the driver. At its top it may be provided with a hand-wheel, crank, or other convenient handle, and it may also be provided with some proper and convenient mode of locking it in position. As the machine advances, the inner end of the apron-carrier D is beneath the driver, and he can have constantly under his observation the grain as it arrives at the inner side of the machine, and he can from time to time increase or diminish the resistance of the section $i$ by changing its inclination to the back board, I.

At the inner end of the apron D, I place a cradle or receptacle, K, into which the grain is delivered by the apron D, and from which it is removed by the elevator and carried over the wheel B to the binder, whether the same is automatic or hand. Heretofore the grain has been taken by the elevator as fast as delivered by the apron and carried to a receptacle at or near the top of the elevator-frame, where it is suffered to accumulate in a position exposed to disturbance by the wind, &c. When the grain stands thin upon the ground it accumulates in the receptacle slowly, and is therefore exposed to disturbance for a longer period. In my receptacle K at the foot of the elevator the grain is guarded from disturbances of all kinds, and it remains there until it is wanted by the binder. When a plain apron-carrier, D, is employed, it is necessary to employ a conveyer or packer with my low-down receptacle K because the apron-carrier does not possess sufficient positive control over the grain to force it into the receptacle. Other positively-acting carriers have been used, however, and with them a special packer might not be required. At the present time, however, the plain apron appears to be generally preferred. The conveyer or packer which I prefer consists of a hollow rotating cylinder, M, provided with a sufficient number of perforations, through which teeth or fingers $a\ a$ are caused to be projected while the grain is being moved and withdrawn as they pass the receptacle. The withdrawal of the teeth may be in a radial direction; or it may be effected by permitting them to swing backward on pivots, so as to release and pass under the grain. I prefer the latter mode. I therefore provide a cylinder, M, which is a hollow shell provided with perforations $b$ for the projecting conveyer or packer-teeth $a$. These perforations are arranged in rows longitudinal as to the cylinder. The cylinder M is mounted upon a shaft, $d$, and is driven by power derived from the main wheel. The teeth $a$ project from suitable shafts, P, which are mounted in proper bearings, also supported by the shaft $d$; and I find it convenient to make said bearings in head-plates $e$. Each shaft is provided with a tappet, $g$, and said tappets are controlled by a cam or guide-plate, O, whose surface is curved with a radius equal to the radius of the cylinder M, and its axis coincident with the axis of shaft $d$. Said guide-plate is fixed to the frame of the machine by means of an arm, $o'$, or its equivalent, and extends through an arc of one hundred and eighty degrees. When the tappets $g$ pass under the guide-plate O, they are thereby confined to one position, and the teeth $a$ are held strongly in a radial position; but when the teeth $a$ have passed the highest point in their circuit the tappets pass from under the guide-plate O, and are then free, and the shaft P may rotate and permit the teeth to yield and swing backward and pass under the grain which has been forced forward by said teeth in their advance. After passing the receptacle K the tappet encounters a lug or pin, $h$, which is less distant from the center than is the shaft P, and said tappet and shaft are thereby rotated back to operative position, and before leaving said pin $h$ the point of the tappet passes again under the guide O. A fixed shield, Q, is placed above the cylinder, so that the grain may be sufficiently confined as the teeth $a$ are engaged with it. By the operation of this conveyer or packer the grain is taken from the apron-carrier D as fast as it arrives at the delivery end of said apron, and conveys or packs it into the receptacle K, where it remains until it is removed by the elevator.

As I have already stated, it is desirable that the elevator shall only be employed to carry grain from the receptacle K so often and in such quantities as may be at the time required by the driver. I therefore mount upon suitable pulleys two belts or chains, R, and mount upon said belt a rake or rakes, S, the teeth whereof project out from the chains perpendicular to the direction of motion. As these teeth sweep down into the receptacle K they remove all the grain which is therein and carry it upward and deliver it into the binder or upon the binders' table. While moving up the elevator, the grain is kept in proper place by slats below and above, as is usual. The elevator rake bar or bars S are mounted in journal-bearings attached to the chains or belts R, so that said bar or bars may at the proper time rotate far enough to free the rake-teeth from the gavel as it is discharged from said rake or rakes to the binder—that is to say, when the gavel is discharged from the rake the teeth may, if required, yield backward by a rotation of the bar S, so as to slide under the discharged grain. The bar S is also provided at its ends with projecting arms or tappets $h'$, which extend out laterally and inward so as to rest and slide upon the guide strip or bars E of the frame underneath, and thereby prevent the bar S and the rake-teeth from tilting backward under its load of grain. At the proper moment—that is to say, after the grain has been discharged—the tappets pass off their supports, and the bar S and teeth are free to tilt backward and slide from under the discharged grain. When the grain is discharged from the elevator-rake it is proposed that it shall be received by an automatic binding-machine mounted upon the outer side of the elevator-frame in some usual and well-known way.

My invention does not include the mechanism for binding the sheaf, and as said mechanisms are well known, it is not required that either of them should be described herein in order to understand my invention. Besides, it may sometimes or in some places be preferred to bind the grain by hand, and in that event, instead of an automatic binder, a well-known binders' platform or table may be attached to the outer side of the elevator-frame; or it may sometimes be necessary to drop the gavel upon the ground, to be subsequently bound, and in that event, instead of the binding apparatus or binders' platform or table, a suitable chute or guide-board will be attached, so that the gavel will be conducted to the ground.

The strips $k$, of which the lower ends form the receptacle K, extend upward parallel with the elevator-frame to a point above the main wheel, and at their upper ends they are attached to a cross-bar of the elevator-frame. The rake S, descending on the front of the elevator-frame, passes into the receptacle K by its upper side and in the same direction with the grain which is being forced in by the conveyer or packer, and, therefore, in its passage it simply removes the grain from in front of the conveyer or packer and, carrying it under the lower end of the elevator-frame, slides it up between the strips $k$ and $l$ until above the top of the main wheel and then discharges it, as described. By this means the grain is not carried so high as usual, and there is a corresponding saving in the lifting power. As the gavel is taken from the receptacle by rake or rakes S, the fingers $t$ upon shaft V are thrown forward directly under rake S, thereby arresting all loose or straggling grain which would otherwise be liable to follow the bundle being elevated, thus making a perfect separation between the gavel and loose grain.

The devices for holding and tripping the shaft V are various, and can be supplied by any mechanic. A good one is shown in the segment-rack V' and latch $u$. This segment-rack is mounted upon the shaft V, and is adapted to engage with teeth or ribs properly located on the chain or belt R, in advance of the rake-bar S. The latch $u$ is mounted upon a proper support and adjusted so as to engage with a pin, $u'$, and lock the segment V' when it has been thrown back. Said latch is raised out of engagement by the bar S, and retracting spring $s'$ returns the segment to its initial position when the bar S has raised the latch and released the shaft. The shaft V and its segment and projecting fingers are thrown forward as an initial position, and held so by the spring $s'$ to prevent the packer from forcing the grain up the back of the receptacle. The latch $u$ is then out of action. When the elevator has been started the ribs of the belt engage the teeth of the rack and rotate the shaft V and its fingers back out of the way. The latch $u$ engages with the pin $v'$ and holds the rack and fingers while the gavel is passing. The rake-bar S follows the grain and trips the latch $u$, so that the spring $s'$ is enabled to return the fingers $u$ to their duty.

One of the elevator-rollers, and most conveniently the upper one, is provided with a driving-pulley clutch, m, whereby motion is communicated to the elevator, and the said pulley made capable of disengagement from the roller at any time, so that the elevator will cease to move. The engagement and disengagement of said clutch may be made automatic or placed at the will of the driver. Preferably both ways will be provided, and either used according to circumstances.

A shipping device under control of the driver is shown in the bell-crank shipper n, elbow-lever p, foot-treadle q, and their connecting rods or wires; but many other methods of controlling the clutch may be employed.

It will also be understood that when a mechanical binder is employed the rake and binder may be so coupled that they will alternately start each other, and thus render both entirely automatic. As, for instance, each may be geared to go out of engagement at the completion of each revolution, so that it will come to rest until tripped and started by some outside force. The first starting of the rake may be by hand or by the accumulation of grain in the receptacle; but when it has delivered its gavel and before it has come to rest it may trip and start the binder.

The lever T is a compressor to hold the bundle and compress the same while being bound. In the drawings it is shown as being operated by hand, and the rod r is provided for that purpose.

Having now described my invention, what I claim as new is—

1. In combination with an endless apron-carrier, D, a back board, i, oblique to the line of motion of said apron and projecting over the same, so as to encounter the heads of the grain and retard the same, as and for the purpose set forth.

2. In combination with an endless carrier, D, a back board, i, hinged at one end by a vertical joint to a permanent support, and a controlling device convenient to the hand of the driver, whereby the horizontal angular position of said back board may be changed at will, as set forth.

3. The endless apron-carrier D and the hinged back board, i, combined with the crank-rod J, which controls said back board and extends upward to a position conveniently near to the hand of the driver.

4. A horizontal grain-conveyer which moves across the machine in rear of and parallel to the cutters, and an elevator which carries the grain over the main wheel and delivers it to the binder, as set forth, combined with a packer above the inner end of the carrier and a receptacle at the intersection of said carrier and elevator, wherein the grain may be accumulated and remain in safety until removed by the elevator, as and for the purpose set forth.

5. A horizontal grain-carrier which moves across the machine in rear of and parallel to the cutters, combined with a revolving packer independent of said carrier, a receptacle, K, to receive the grain from said packer, and an elevator the teeth whereof descend on the front side into the top of said receptacle and remove the grain therefrom in a backward direction and upward behind the elevator-frame, substantially as and for the purpose set forth.

6. The receptacle K, formed with strips k, which, from the lower points of attachment, curve downward and backward beneath the foot of the elevator-frame, and then extend upward behind said elevator-frame to a point of attachment above the main wheel, combined with strips l, attached to the elevator-frame, whereby a chute or passage for the gavel is formed.

7. The endless apron-carrier D and the receptacle K at the intersection of said carrier and the elevator, combined with the packer and the shield Q, substantially as set forth.

8. The receptacle K beneath the foot of the elevator, combined with the pivoted fingers t, whereby the grain packed into said receptacle will be arrested and prevented from flowing out at the rear of the same, as set forth.

9. The shaft V, provided with the fingers t, the segment V', and a retracting-spring, combined with a locking-latch, u, and engaging teeth or ribs on the chain or belt R, whereby said teeth are rotated when the gavel is about to be removed.

MOSES T. RIDOUT.

Witnesses:
  EDGAR RIDOUT,
  U. M. PIERCE.